MEMORY APPARATUS

Filed April 8, 1957 3 Sheets-Sheet 1

INVENTOR.
RAYMOND STUART-WILLIAMS
BY Lyon & Lyon
ATTORNEYS.

MEMORY APPARATUS

Filed April 8, 1957

3 Sheets-Sheet 2

INVENTOR.
RAYMOND STUART-WILLIAMS

BY Lyon & Lyon

ATTORNEYS.

Aug. 9, 1960 R. STUART-WILLIAMS 2,948,885

MEMORY APPARATUS

Filed April 8, 1957 3 Sheets-Sheet 3

INVENTOR.
RAYMOND STUART-WILLIAMS
BY Lyon & Lyon
ATTORNEYS.

United States Patent Office 2,948,885

Patented Aug. 9, 1960

2,948,885

MEMORY APPARATUS

Raymond Stuart-Williams, Pacific Palisades, Calif., assignor to Telemeter Magnetics, Inc., Los Angeles, Calif., a corporation of New York Filed Apr. 8, 1957, Ser. No. 651,244

9 Claims. (Cl. 340—174)

This invention relates to data-storage systems of the type employed in information-handling machines and, more particularly, to an improved arrangement for indicating the availability of data-storage locations within the storage system.

Before information can be written into any of the presently known digital data-storage systems, it is necessary to determine whether or not the location or address of the portion of the storage system into which the information is to be written is available for such storage. Otherwise, if data is previously stored therein, the result may be either the destruction of the data previously stored or the loss of the data which is sought to be stored, or both. Different expedients are employed to indicate whether a storage location is available. This may be done by either marking the last location where a writing occurred which provides a signal indicative of the fact that thereafter the storage locations are empty, or by using some auxiliary storage system which may be read for the purpose of determining whether or not a storage location is filled or empty.

An object of the present invention is the provision of a novel arrangement for indicating the condition of a storage location in a data-storage system.

Another object of the present invention is the provision of a novel and simple indicating arrangement for the fill or empty condition of data-storage locations.

One of the digital data-storage systems presently finding increasing favor in information-handling machines is the coincident-current magnetic-storage system. These employ a plurality of storage core planes, each of which includes magnetic cores arranged in rows and columns. These magnetic cores are saturable at either of two magnetic polarities. They are coupled to coils (row, column, and digit-plane coils) so that usually a double coincidence of excitation of the row and column coils and the presence or absence of excitation in the digit-plane coils is used for writing data. One binary bit of data is written in each core plane, and usually data storage is parallel in the planes. With these systems, however, it is inexpedient and expensive to mark a filled location for the location of available spaces. Therefore, in order to establish the fill or empty status of data-storage locations in a magnetic-core memory, it has been customary to employ other expensive arrangements for the above-mentioned purposes. Although not limited thereto, the present invention finds its greatest use in connection with magnetic-core data-storage systems.

Accordingly, a further object of the present invention is the provision of a novel and inexpensive and simple system for indicating the fill or empty conditions of the storage locations in a magnetic-core data-storage system.

These and other objects of the present invention are achieved by the provision of the plurality of cores arranged in columns and rows, the number of cores in said plurality corresponding to the number of data locations in the data-storage system with which this invention is to be employed. A number of double-row and double-column coils are provided. Each double-column coil is connected to all the cores in a column in one sense and all the cores in a second column in opposite sense. Each double-row coil is coupled to all the cores in a row in one sense and to all the cores in a second row in the opposite sense. The arrangement of the cores and the coils is such that upon the coincident excitation of a double-row and double-column coil a reading operation occurs upon the core which is associated with a location in the data-storage system into which it is desired to write or from which it is desired to read, and a writing operation occurs on the core which is associated with the location which was previously written into or read from. Two reading coils are provided for this auxiliary or control core plane. These coils are coupled to the two groups of cores formed within the plane by the reading-writing operation so that only one of the windings is coupled to the core being read from. Means are provided for detecting a signal, if any, from this core, indicative of the fact that the next storage location which will be addressed is not available for writing or contains no data for reading.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

In the following description of the invention, it will be shown how it co-operates with a magnetic-core data-storage system. More specifically, the data-storage system is of the type called a buffer-storage unit, which was constructed and operated. However, this is not to be construed as a limitation upon the invention, since to those skilled in the art it will be readily apparent how this invention may be arranged for use with other types of storage systems without departing from the spirit of this invention.

Figure 1:
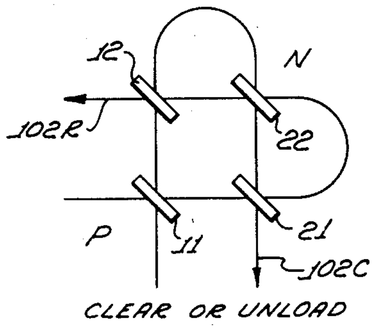
Figures 1 and 2 are an arrangement of cores and coils shown to illustrate the principles employed in this invention.
Figure 2:
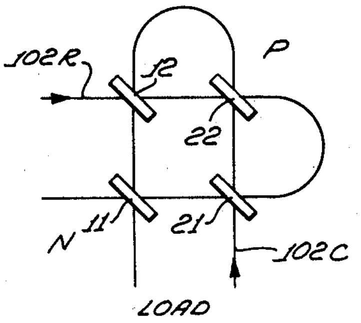

Reference is now made to Figures 1 and 2, which are an arrangement of cores and coils shown to illustrate the principles employed in this invention. Both drawings show the same four cores 11, 12, 21, 22, to which are coupled a row coil 102R and a column coil 102C. The arrowheads designate the current-flow direction through these coils. Thus, in Figure 1, with the current flow represented by the arrowheads, core 11, to which the row and column coils are coupled, will receive the sum of the magnetomotive forces produced by the current flowing through the coils to which it is coupled, and thus will be driven to saturation at one polarity, which will be considered as the P-polarity saturation state. Core 22 will receive the sum of the magnetomotive forces provided by the current flowing in the opposite direction, so that it is driven to the polarity opposite to that of core 11. This polarity will be represented as the N-polarity. The remaining two cores 12 and 21 have applied the differences of the magnetomotive forces and, therefore, are not driven from saturated condition in which they previously existed.

Let it be assumed that the current directions shown in Figure 1 are those which occur when a location in a memory with which this invention is associated is addressed for clearing or unloading of this data. Figure 2 shows an opposite current flow through the coils 102R, 102C, which is made to occur when the memory location is addressed for writing data or loading. In this event, the sum of the magnetomotive forces are applied to core 22 to drive it to the P condition and the sum of these magnetomotive forces are applied to core 11 to drive it to the N condition. Cores 12 and 21 remain substantially unaffected.

Now, let core 22 be associated with a specific data-storage location in the memory and let core 11 be associated with a data-storage location which in either a writing or a reading sequence preceded the location with which core 22 is associated. If a core is put in a P state when its associated data location is filled and in an N state when its associated data location is empty, then the arrangements shown in Figures 1 and 2 enable a reading of the condition of core 22 and thereby an indication of the contents of its associated storage location and enable a writing into core 11, whereby it is put into a condition which represents whether its associated core location has been filled or emptied. By the expedient to be described hereafter, the condition of the core which is read is made to represent whether the next location in the memory which is to be addressed in the read or write sequence is full or empty.

Figure 3:
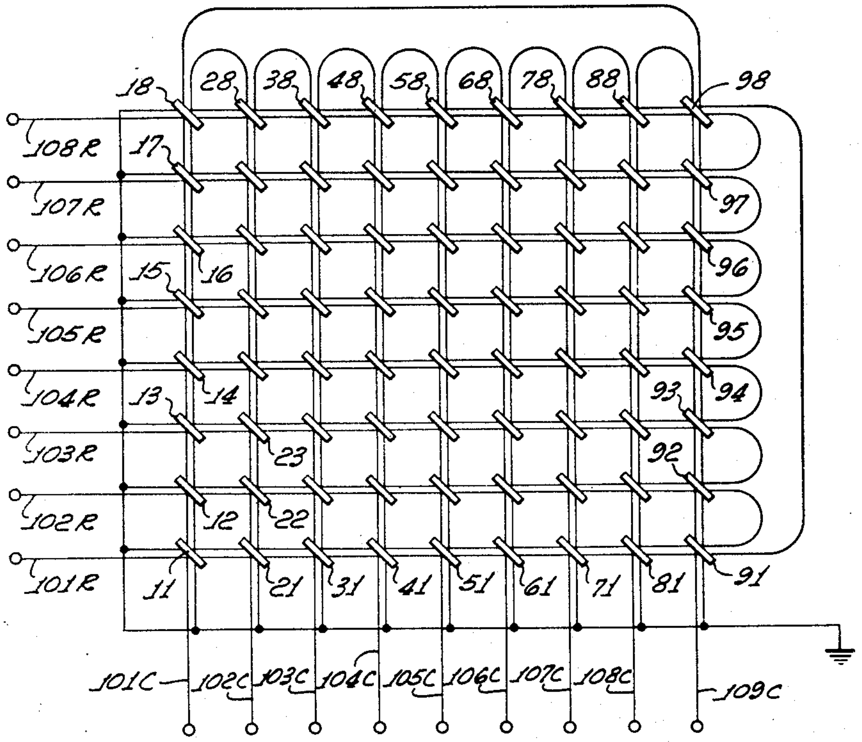
Figure 3 is a magnetic-core plane in accordance with this invention.
Figure 4:
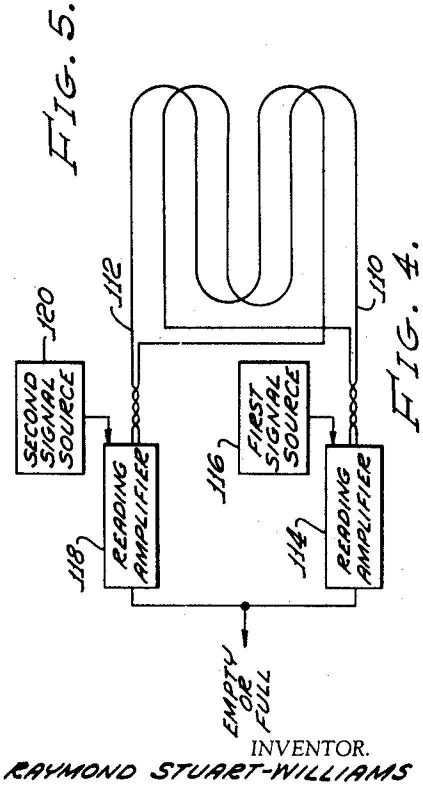
Figure 4 shows the reading windings for the magnetic-core plane shown in Figure 3.

Reference is now made to Figure 3, which shows an arrangement of magnetic cores in a control plane in accordance with the teachings of this invention. The reading windings for this plane are shown in Figure 4 and not in Figure 3 to preserve simplicity in the drawings. The number of cores shown is by way of illustration and is not to be taken as a limitation upon the invention. One core is provided for each data-storage location in an associated memory. The number of rows and columns of cores employed are the same as those in the core memory with which this control plane is to be associated. The first column contains cores numbered 11 through 18, the last, or ninth, column contains cores numbered 91 through 98. Double-row coils are employed, respectively numbered 101R through 108R. Each double-row coil is coupled to all the cores in one row in one sense and then turned to be coupled to all the cores in another row in an opposite sense. Thus, coil 101R is inductively coupled to all the cores 11 through 91 in one sense and then is inductively coupled to the cores 18 through 98 in the opposite sense. Row coil 102R is inductively coupled to cores 12 through 92 in one sense and then is inductively coupled to cores 91 through 11 in the opposite sense.

Double-column coils 101C–109C employ the same arrangement with respect to the columns. Thus column-coil 101C is inductively coupled to cores 11 through 18 in one sense and then in the opposite sense to cores 98 through 91. Double-column coil 102C is inductively coupled to all cores 21 through 28 in one sense and then to cores 18 through 11 in the opposite sense. When Figures 1 and 2 are considered together with Figure 3, it will be seen that simultaneous reading and writing of two diagonally related cores may be achieved by applying current coincidentally to the double row and column coils coupled to those cores.

Reference is now made to Figure 4, which is a circuit diagram of the two reading windings 110, 112 which are employed in the core plane shown in Figure 3. One of these 110 is coupled to alternate rows of cores and the other of these 112 is coupled to the remaining rows of cores. Thus, reading winding 110 is coupled to the first, third, fifth, and seventh rows of cores and reading winding 112 is coupled to the second, fourth, sixth, and eighth rows of cores. Reading winding 110 is coupled to a reading amplifier 114 which, in order to provide an output, requires an enabling input from a first signal source 116. Reading coil 112 is also coupled to a reading amplifier 118, which does not provide an output unless an enabling signal is received from a second signal source, 120.

The one of these two reading amplifiers which is enabled is determined by the location of the core whose condition it is desired to read. In accordance with the description given above for Figures 1 and 2, if it is desired to read the condition of core 22, then an enabling signal is required from the second signal source 120, since reading coil 112 is coupled to the second row. If core 23 were desired to be read, then an enabling signal from the first signal source 116 would be applied to reading amplifier 114, since reading coil 110 connected thereto is coupled to the cores including core 23. Effectively, the two reading windings are coupled to two groups of cores, the condition of one of which is being read while the other is having its condition altered. With the usual loading and unloading operations which occur in a buffer storage system, the core sequence will be such that first one and then the other of the reading amplifiers will be enabled.

In the operation of the embodiment of the invention with a storage system, it is important that the writing or loading of data into the storage system or the unloading of data occur in a sequential manner. That is, the point or location within the system wherein loading or unloading is to commence may be random, but once the loading or unloading has commenced, it should occur in a sequence such that a core in the control plane which is associated with the present memory location is read from and a core in a previous location in the sequence of memory storage or readout is written into. The double column and row coil winding arrangement shown in Figure 3 should not be considered as the only one permissible, since other configurations of the double coils (both column and row) may be employed and still be within the spirit of this invention. In this connection, arrangements for simultaneous reading and writing in a core plane which differ from the one shown herein are described and claimed in an application to this inventor for Magnetic Memory System, Serial No. 492,844, filed March 8, 1955.

Figure 5:
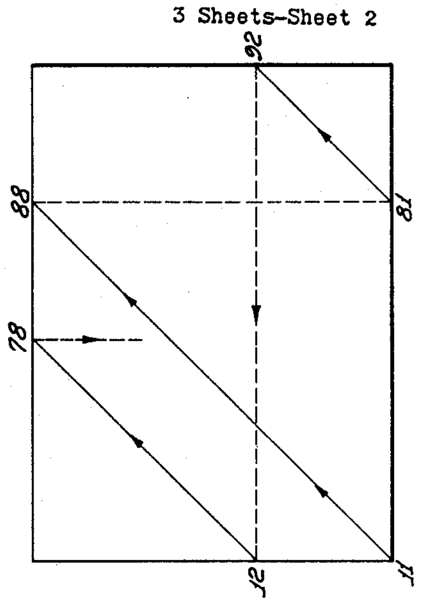
Figure 5 shows a preferred matrix-scanning sequence.

While any method of sequencing a memory for write-in and readout may be employed, a favored sequencing system is shown in Figure 5, which is a sequencing diagram. The numbers disposed around the periphery of the rectangle are those of cores shown in Figure 3 and enable an orientation therewith. Thus coils 101R and 101C are excited first and 102R and 102C second, etc., so that the first core scan progresses along the diagonal, including cores 11, 22 . . . 88. This is represented by the arrow joining cores 11 and 88. Then coils 101R and 108C are excited, followed by the application of current also to coils 102R and 109C. This traverses the diagonal between cores 81 and 92. This is followed by excitation of coils 102R and 101C. This initiates traverse of the diagonal between cores 12 and 78. From this, the plan of scanning should become apparent. A scan progresses along a diagonal until the top core of the plane is reached. The next diagonal scan progresses from the core at the bottom in the same column. When one side of the core plane is reached, the next scan progresses with the core on the other side in the same row.

Figure 6:
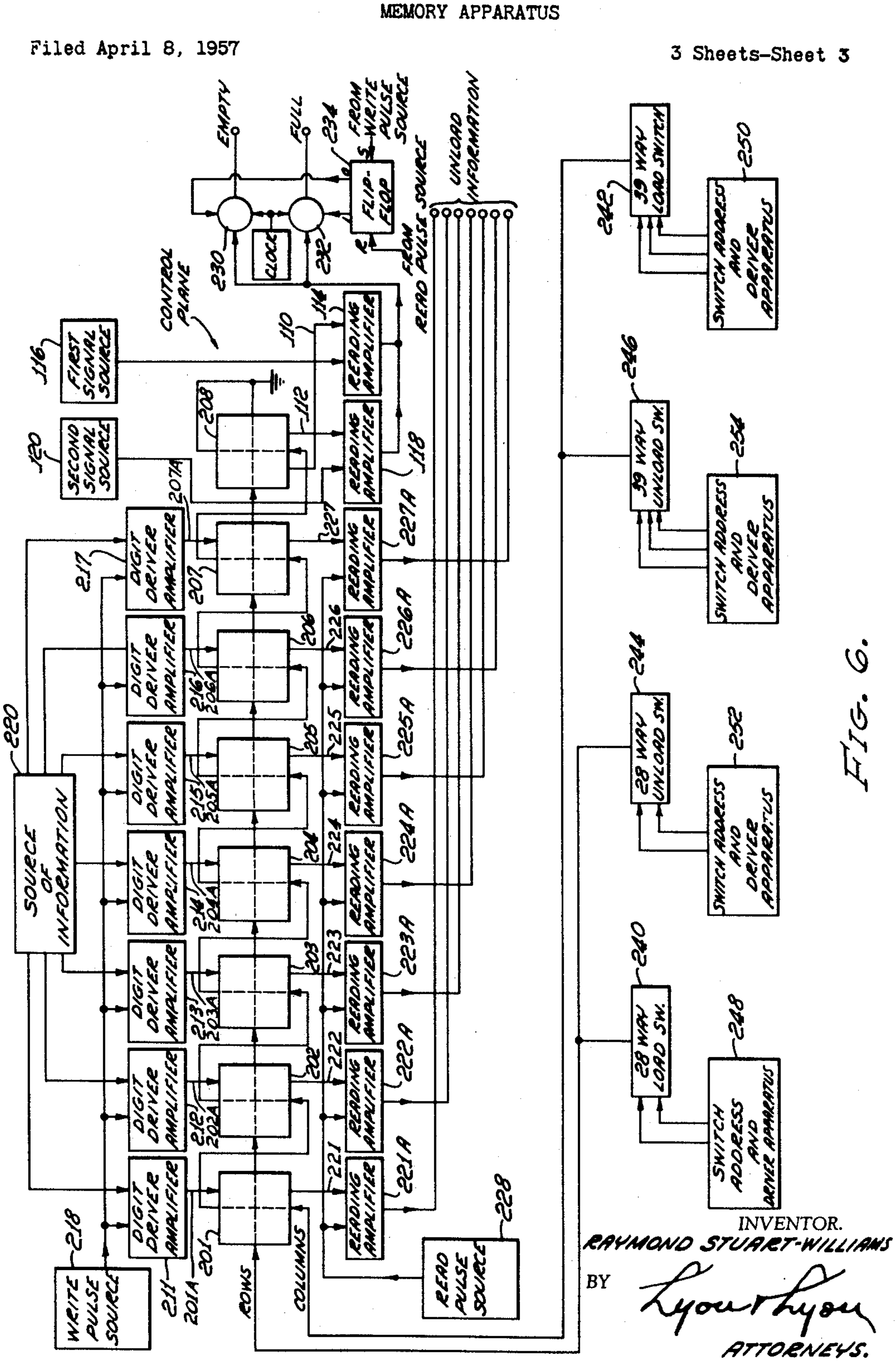
Figures 6 shows a block diagram of this invention.

Figure 6 shows a block diagram of an embodiment of the invention comprising the combination of the data-storage system with the control core plane for indicating the filled or empty condition of the data-storage locations in the memory. The memory consists of a plurality of cores arranged in columns and rows. In an embodiment of this invention which was built, there were 1092 cores in each core plane arranged in 39 columns and 28 rows. The respective core planes each had a separate row coil for each row and a separate column coil for each coulmn (not shown). Each column coil was connected in series with every other similarly located column coil in the core planes. Each row coil was connected in series with every other similarly located column coil in the core plane. Accordingly, when a drive current was applied to a row coil and a column coil, the coincidence of these drives would occur at similarly located cores in all the core planes 201 through 207.

The control core plane 208 has its double-column and double-row coils connected to one end of the similarly located row and column coils of the memory, whereby selection of any row or column coil in the memory also selects the corresponding double-row and double-column coil in the control plane.

In well-known manner, for the purpose of writing, each one of the memory-core planes has a digit-plane coil 201A through 207A, which is coupled to all the cores in the associated plane. When it is desired to write a "one" in a particular core plane, the digit-plane coil is not excited by a current; when it is desired to write a "zero," the digit-core plane is excited by a current, which provides at a selected core a magnetomotive force opposite to the one resulting from the coincident currents flowing in the row and column coils coupled to that selected core, thus inhibiting it from being driven. Each digit-plane coil has an associated digit-driver amplifier 211 through 217. These digit-driver amplifiers are enabled to write in response to a pulse from a write-pulse source 218, together with the writing pulse (present for a zero, and absent for a one) from the source of information 220.

For the purpose of reading, each core plane has a reading coil 221 through 227, each of which is coupled to all the cores in its associated plane. The output of the reading coils are respectively applied to reading amplifiers 221A through 227A. These are enabled in well-known manner by pulses from a reading pulse source 228.

The control plane 208 has the two reading windings 110 and 112, as shown in Figure 4, which applied their outputs respectively to the reading amplifiers 118, 114. These amplifiers are alternately enabled from signal sources 116, 120. The output of the respective reading amplifiers, if any, is applied to two AND gates 230, 232. A flip-flop 234 is driven to its set condition by an output from the write-pulse source 218, and is reset by an output from the read-pulse source 228. When set, the output of flip-flop 234 is applied to enable the AND gate 232, so that any output received from this AND gate is indicative of the fact that the location in the memory into which it is sought to write has been previously occupied. Similarly, the flip-flop 234 applies an enabling input to AND gate 230. When an output is received from this AND gate, this is indicative of the fact that the storage location from which readout is being sought is empty of data. With sequential operation, an output will be obtained from AND gate 232 only when the core-storage system is full, and an output will be obtained from the AND gate 230 only when the core-storage system is empty.

For operating the storage system, as well as determining the condition of the location where it is sought to write, the row coils are driven by a magnetic core switch 240, designated as a 28-way load switch. The column coils are driven by a magnetic switch 142, designated as a 39-way load switch. For the purpose of loading, the current is applied to the columns and row coils in one direction. For the purpose of unloading, current is applied to column and row coils in the opposite direction, employing the 28-way unload switch 244 and a 39-way unload switch 246. For the purpose of obtaining the matrix-scanning sequence shown in Figure 5, the 28-way load switch 240 and 39-way load switch 242 are respectively driven by switch-address driver apparatus 248, 250. For the purpose of unloading in accordance with the same pattern, switch-address driver apparatus 252, 254, respectively drive the 28-way unload switch 244 and the 39-way unload switch 246. The magnetic switches employed may be those described and shown by M. Karnaugh in the May 1955 issue of the Proceedings of the Institute of Radio Engineers. The switch-address and driver apparatus may be any suitable and well-known counter arrangement of amplifiers and flip-flops for selectively applying current to the leads of the switches in the desired sequence.

From the above description, it should be apparent that entry of data into the storage memory occurs in parallel form as seven binary bits, one bit into each core plane. Readout also occurs in parallel form, the address locations providing outputs in accordance with the information stored therein. Simultaneously with the addressing or application of coincident currents to the memory core planes, coincident current is applied to the double-row and double-coil windings having identical locations in the control matrix, whereby the core at the location corresponding to the one addressed has its condition interrogated, and the core at the location corresponding to the previous address in the writing or reading sequence in the storage memory is written into. Either signal source 116 or 120 is actuated, depending on the core location addressed for readout. The empty or full outputs of the control plane may be employed either to signal to an operator that such condition exists, or to actuate well-known logical circuits to initiate write-in to the system when it is shown to be empty, or prevent further writing thereinto when it is shown to be full.

Figure 7:
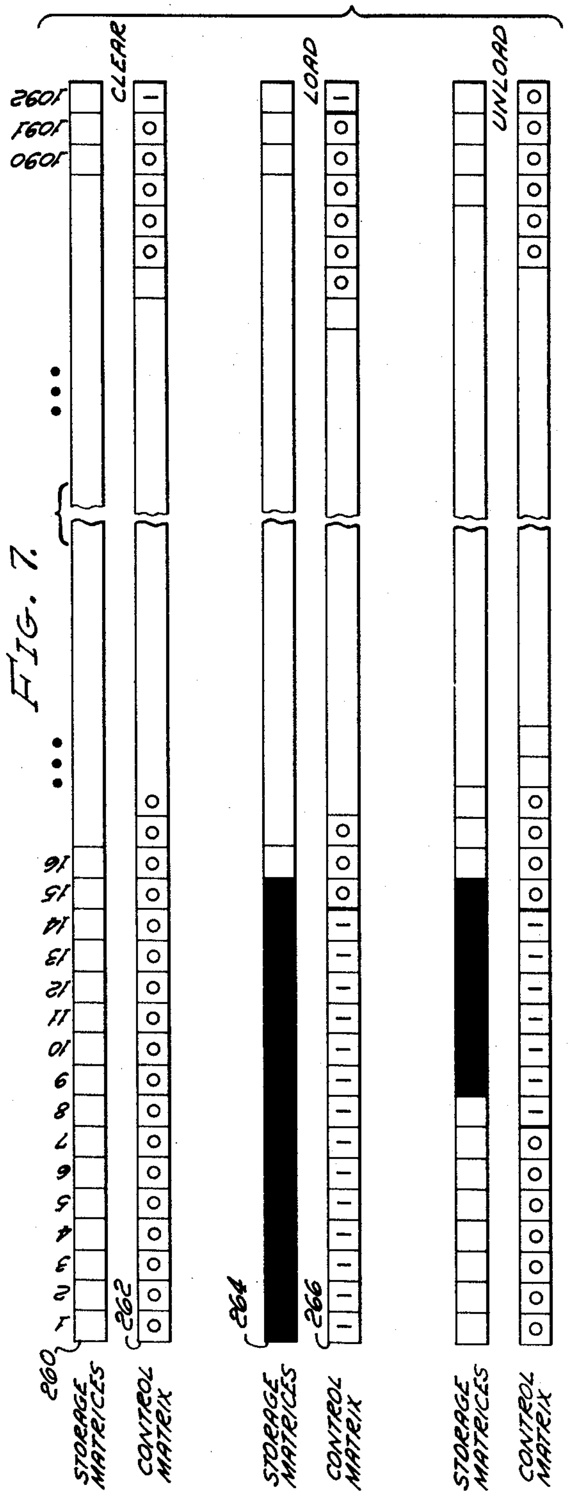
Figure 7 shows comparative diagrams of storage matrix contents with associated control matrix contents.

In order to further assist in an understanding of how the control matrix co-operates with a storage system to preserve the condition of data in the storage as well as to indicate the availability of the next storage location, reference is made to Figure 7, which shows a representation of the contents of the storage matrices at their respective locations as compared with the contents of the conrol matrix at the associated location. Each address in a storage matrix corresponds to the small rectangle having the address numbers from 1 to 1092 thereover. If the address has data written therein, the rectangle is filled; otherwise, it is empty. Immediately below the storage matrix rectangle is a control-matrix rectangle having the corresponding or associated address. If the core in the control matrix at the address is in a condition indicative of the fact that data has been written into the associated address location in the storage matrix, then a "one" is in the rectangle. If the core in the control matrix is in a condition indicative of the fact that the associated location in the storage matrix is available for writing into, then a "zero" is placed in the rectangle, corresponding to that core, with the following exceptions: First, the core associated with the last storage location which was written into will be in the "zero" polarity condition. Second, the core associated with the last position which was read from will be in the "one" state of magnetic saturation, or polarity. Thus, when the memory is empty, all the cores in the control matrix will be in their "zero" state of magnetic saturation except for the last address which was read from, which is the 1092d address, and the core corresponding thereto will be in its "one" polarity condition. This is represented by rectangles 260, which indicate that no data is stored at any of the address locations in the storage matrices, and rectangle 262, wherein there are "zeros" at every core location except the last one, which signifies this fact.

Rectangles 264 and 266 represent the condition which arises when data is being loaded into the storage memory. Every core corresponding to the addresses in the storage matrix which are loaded is in a "one" condition of magnetic saturation (P), except for the core which is associated with the last address which was written into. This is in a "zero" condition of magnetic saturation (N).

In accordance with the operation of the system described, when it is sought to write into the next storage location, currents are applied to the double-row coil and double-column coil which are coupled to the core associated with the next storage location and with the core associated with the last previously written-into storage location, which tend to drive the core associated with the next location to a "zero" condition, and the core associated with the last address written into the "one" condition. If the core in the zero condition is driven to a one, an output occurs in the reading coil; if the core is driven to a zero and is already at zero, no output occurs in the reading coil.

Thus, as long as the next location into which a "write" is being sought is empty, the associated core is at zero and no output will be obtained from the reading coil coupled to that core, since the other reading coil which is coupled to the other core being driven is blocked or held inactive, the drive to "one" of that core is not detected. Loading occurs with the cores being successively driven as the loading occurs in successive addresses until the 1092d core is reached. Since this is in a "one" condition, a signal will be read, indicative of the fact that the storage system is filled.

When an unloading operation occurs, the currents which are applied to the memory as well as to the control plane double-row and double-column coils is in reverse to the current applied in the process of loading. Therefore, the core in the address corresponding to the one at which a readout is being made is in the "one" condition; also, the core in the address previous to this is in the "one" condition. From the previous description, it should be apparent that the core which has the address associated with the last storage location which was written into is left in the zero condition.

As a location is addressed for readout, the core associated with that address is driven toward the "one" condition of magnetic saturation, and the core associated with the previous address is driven to the zero condition of magnetic saturation. Thus, a zero condition is reinserted in the cores of the control matrix as readout proceeds. When a readout is made from the last address filled with data in the storage stystem, the core associated with that address in the control plane will be driven from a "zero" to a "one" condition, which produces an output in the reading coil coupled to that core, indicating the fact that the storage system is now empty. It will be seen that the core in the control plane having the previous address is left in a "one" condition. Entry of information subsequently into the data-storage system will occur in address locations subsequent to this one, so that the memory system will be completely filled and before the core having the "one" is reached.

The arrangement shown lends itself to other uses besides that of indicating where data is written in a memory system. It can be used to mark positions or addresses within a memory for indexing purposes, for timing purposes, or for purposes of initiating operations which are to occur after the capacity of the particular section allocated indicated by the mark has been reached. It is well within the skill of one versed in the art to drive a core in the field of zeros to one at the location at which such mark is desired. Alternatively, when a readout mark is required, it is also well within the skill of those versed in the art to write a zero in the field of ones which is left when the data-storage system is loaded. Although in the description the double-column and double-row coils are driven in series with the column and row coils of the memory, the expedient of applying a separate drive thereto simultaneously with that applied to the memory which addresses cores associated with the same locations which are sought to be filled or emptied from the storage system may be employed as an expedient, although the one shown and described herein is preferred, since it is more economical and dependable.

Accordingly, there has been shown and described a novel, useful, and simple arrangement which indicates the condition of the contents of a storage system into which it is sought to write or from which it is sought to read in time so that such write-in or readout may be prevented where conditions so warrant.

I claim:

1. The combination with a data-storage system of the type wherein each data location has a different address, data is read from the said storage system in the same sequence as it was written, and there is a means for establishing the address of a location into which it is desired to write and a means for establishing the address of a location from which it is desired to read, of means for indicating the storage condition of a data-storage location comprising a plurality of magnetic storage cores each having two states of magnetic remanence and being capable of being driven from one to the other state, a different one of said cores being associated with a different one of said data-storage locations, means responsive to said means for establishing the address of a location into which it is desired to write to detect the state of magnetic remanence of the core associated with the location addressed and to drive the core associated with a location previous to the one being addressed to one state of magnetic remanence, and means responsive to said means for establishing the address of a location from which it is desired to read to detect the state of magnetic remanence of the core associated with the location addressed and to drive the core associated with a location previous to that of the one being read to the other state of magnetic remanence.

2. The combination with a data-storage system of the type wherein each data-storage location has a different address, the addresses have a numbered sequence, and there are means for establishing the address of a location into which it is desired to write, and means for establishing the address of a location from which it is desired to read, of an improved means for indicating the storage condition of a data-storage location comprising a plurality of magnetic-storage cores, each having two states of magnetic remanence and being capable of being driven from one to the other state, a different one of said cores being associated with a different one of said data-storage locations, means responsive to said means for establishing the address of a location into which it is desired to write to drive the core associated with that location to one state of magnetic remanence and to drive to the other state of magnetic remanence a core associated with a data-storage location having a preceding address in said numbered sequence, means for detecting output from said core associated with the location into which it is desired to write indicative of the fact that the next storage location was previously filled, means responsive to said means for establishing the address of a location from which it is desired to read to drive the associated core to the other state of magnetic remanence and to drive a core associated with a data-storage location having a preceding address toward said one state of magnetic remanence, and means for detecting output from said core associated with the data location from which it is desired to read indicative of the fact that the next storage location is empty.

3. The combination with a data-storage system of the type wherein each data location has a different address, data is read from the said storage system in the same sequence as it was written, and there is a means for establishing the address of a location into which it is desired to write, of means for indicating the storage condition of a data-storage location comprising a plurality of magnetic cores divided into two groups each of said cores having two states of magnetic remanence and being capable of being driven from one to the other state, a different one of said cores being associated with a different one of said data-storage locations, a first reading coil coupled to all the cores in one of said two groups, a second reading coil coupled to all the cores in the other of said two groups, means responsive to said means for establishing the address of a location into which it is desired to write to drive the core associated with that location toward magnetic remanence at one of said two states and to drive a core associated with a location previous to the one being addressed to magnetic remanence at the opposite state, and means responsive to an output in the reading coil coupled to the core associated with the addressed location indicative that said core is in the other of said two states of magnetic remanence to indicate that location following the one being addressed was previously filled.

4. The combination with a data-storage system of the type wherein each data location has a different address, data is read from the said storage system in the same sequence as it was written, and there is a means for establishing the address of a location from which it is desired to read, of means for indicating the condition of a data-storage location comprising a plurality of magnetic cores divided into two groups each of said cores having two states of magnetic remanence and being capable of being driven from one to the other state, a different one of said cores being associated with a different one of said data-storage locations, a first reading coil coupled to all the cores in one of said two groups, a second reading coil coupled to all the cores in the other of said two groups, means responsive to said means for establishing the address of a location from which it is desired to read to drive the core associated with that location toward magnetic remanence at one of said two states and to drive a core associated with a location previous to the one being addressed to remanence at the opposite state, and means responsive to an output in the reading coil coupled to the core associated with the addressed location indicative that said core was in the other of said two states of magnetic remanence to indicate that next location to be addressed is empty.

5. The combination with a data-storage system of the type wherein each data location has a different address, data is read from the said storage system in the same sequence as it was written, there are means for selecting the address of a location into which it is desired to write, and means for selecting the address of a location from which it is desired to read, of means for indicating the storage condition of a data-storage location comprising a plurality of magnetic-storage cores each having two states of magnetic remanence and being capable of being driven from one to the other state, a different one of said cores being associated with a different one of said data-storage locations, said plurality of cores being divided into two groups a sequence of reading data and a sequence of writing data proceeding from a location having an associated core in one group to a location having an associated core in the other group, a first reading coil coupled to all the cores in said one group, a second reading coil coupled to all the cores in said other group, means responsive to said means for selecting the address of a location into which it is desired to write to drive the core in the group associated with said location to one state of magnetic remanence and to drive a core in the other groups associated with a previous location to the other state of magnetic remanence, means to detect a signal in the reading coil coupled to the cores including said core associated with said addressed location indicative that the next location to be addressed is filled, means responsive to said means for selecting the address of a location from which it is desired to read to drive the core in the group associated with said location to the other state of magnetic remanence and to drive a core in the other group associated with a previous location to the one state of magnetic remanence, and means to detect a signal in the reading coil coupled to the cores including said core associated with said addressed location indicative of the fact that the next location to be addressed is empty.

6. The combination with a data-storage system of the type wherein each data location has a different address, data is read from the said storage system in the same sequence as it was written, there are means for selecting the address of a location into which it is desired to write, and means for selecting the address of a location from which it is desired to read, of means for indicating the storage condition of a data-storage location comprising a plurality of magnetic-storage cores each having two states of magnetic remanence and being capable of being driven from one to the other state, a different one of said cores being associated with a different one of said data-storage locations, said plurality of cores being divided into two groups a sequence of reading data and a sequence of writing data proceeding from a location having an associated core in one group to a location having an associated core in the other group, said plurality of cores being arranged in columns and rows, a plurality of column coils each of which is coupled in one sense to the cores in a column in one group and in the opposite sense to the cores in a column in the other group, a plurality of row coils each of which is coupled in one sense to the cores in one row and the opposite sense to the cores of a different row, a first reading coil coupled to all the cores in one group, a second reading coil coupled to all the cores in a second group, means responsive to said means for selecting the address of a data location into which it is desired to write to apply a current in one direction to the row and column coil including the core associated with said location, means to detect a signal in the reading coil coupled to said core indicative that the next data location to be addressed was previously filled, means responsive to said means for selecting the address of a data location from which it is desired to read to apply a current in an opposite direction to the row and column coil including the core associated with said location, and means to detect a signal in the reading coil coupled to said core indicative that the next data location to be addressed is empty.

7. The combination with a coincident-current magnetic-core memory of the type used for storing data including a plurality of core planes each including a plurality of magnetic cores, a means for selecting a core at a desired location simultaneously in all of said core planes for writing in information, and a means for selecting a core at a desired location simultaneously in all of said core planes for reading out information stored therein, of a control magnetic-core plane comprising a plurality of magnetic cores arranged in columns and rows and having a core for and associated with each data-storage location in said memory, a plurality of double-column coils each of which is coupled in one sense to one column of cores and in the opposite sense to a second column of cores, a plurality of double-row coils each of which is coupled in one sense to one row of cores and in the opposite sense to a second row of cores, at least two reading coils one of which is coupled to all the cores in alternate rows of said control core plane, the other of which is coupled to the remaining cores in said control plane, means responsive to said means for selecting cores at a desired location in said memory for writing in information to apply current in one direction to a double-column and double-row coil coupled to an associated core, means responsive to said means for selecting cores in said memory at a desired location for reading to apply current in an opposite direction to a double-column and double-row coil coupled to an associated core in said control plane, a separate signal-detecting means coupled to each reading coil, and means to activate the one of said signal-detecting means coupled to a reading coil coupled to a core associated with a selected location.

8. The combination with a magnetic-core memory of the type including a plurality of core planes each having columns and rows of magnetic cores, a different column coil coupled to all the cores in each column, a different row coil coupled to all the cores in each row, means coupling correspondingly located column coils of all said core planes in series, means coupling correspondingly located row coils of all said core planes in series, means for applying current for writing at a desired location to a selected row and column coil, and means for applying current for reading from a desired location to a selected row and column coil, of a control magnetic-core plane comprising a plurality of magnetic cores arranged in columns and rows corresponding to those in said core planes and having a core for each storage location, a plurality of double-column coils each of which is coupled in one sense to the column of cores and in the opposite sense to a second column of cores, a plurality of double-row coils each of which is coupled in one sense to one row of coils and in the opposite sense to a second row of cores, at least two reading coils one of which is coupled to all the cores in alternate rows of said control core plane, the other of said reading coils being coupled to the remaining cores in said control plane, means responsive to the application of current for writing to a row and column coil of said memory for applying current in one direction to a double-row and double-column coil occupying locations corresponding to those of the selected row and column coils, means responsive to the application of current for reading to a row and column coil of said memory for applying current in an opposite direction to a double-row and double-column coil occupying locations corresponding to those of the selected row and column coils, and means for detecting a signal, if present, from the one of said two reading coils coupled to the core occupying a location corresponding to the one selected by excitation of the row and column coil of said memory.

9. The combination with, a magnetic-core memory of the type including a plurality of core planes each having columns and rows of magnetic cores, a different column coil coupled to all the cores in each column, a different row coil coupled to all the cores in each row, means coupling correspondingly located column coils of all said core planes in series, means coupling correspondingly located row coils of all said core planes in series, means for applying current for writing at a desired location to a selected row and column coil, and means for applying current for reading from a desired location to a selected row and column coil, of a control magnetic-core plane comprising a plurality of magnetic cores arranged in columns and rows corresponding to those in said core planes and having a core for each storage location, a plurality of double-column coils each of which is coupled in one sense to the column of cores and in the opposite sense to a second column of cores, a plurality of double row coils each of which is coupled in one sense to one row of coils and in the opposite sense to a second row of cores, means coupling one end of each said double-column coils to one end of a correspondingly located column coil in said memory, means coupling one end of said double-row coils to one end of a correspondingly located row coil in said memory, two reading coils one of which is coupled to all the cores in alternate rows of said control core plane, the other of which is coupled to the remaining cores of said control core plane, and means upon selection of a location in said memory for readout and upon selection of a location for write-in for detecting a signal, if present, from the one of said two reading coils coupled to the core occupying a location corresponding to the one selected.

References Cited in the file of this patent

UNITED STATES PATENTS

| | | |
|---|---|---|
| 2,614,169 | Cohen et al. | Oct. 14, 1952 |
| 2,802,203 | Stuart-Williams | Aug. 6, 1957 |